United States Patent
Jeon (10) Patent No.: US 9,951,454 B2
(45) Date of Patent: Apr. 24, 2018

(54) WASHING MACHINE

(71) Applicant: LG ELECTRONICS INC., Seoul (KR)

(72) Inventor: Byeongjin Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 14/796,402

(22) Filed: Jul. 10, 2015

(65) Prior Publication Data

US 2016/0010259 A1    Jan. 14, 2016

(30) Foreign Application Priority Data

Jul. 11, 2014 (KR) .................. 10-2014-0087719

(51) Int. Cl.
| | | |
|---|---|---|
| *D06F 37/20* | (2006.01) | |
| *F16F 9/32* | (2006.01) | |
| *D06F 37/24* | (2006.01) | |
| *F16F 13/00* | (2006.01) | |

(52) U.S. Cl.
CPC .............. *D06F 37/20* (2013.01); *D06F 37/24* (2013.01); *F16F 9/3278* (2013.01); *D06F 37/203* (2013.01); *D06F 37/245* (2013.01); *F16F 13/005* (2013.01)

(58) Field of Classification Search
CPC .......... D06F 37/24; D06F 37/20; D06F 37/22; F16F 1/24; F16F 7/09; F16F 9/3278; F16F 13/005
USPC ................................................. 68/23.1, 23.4
See application file for complete search history.

(56) References Cited

U.S. PATENT DOCUMENTS

| | | | |
|---|---|---|---|
| 5,117,659 A | 6/1992 | Sharp et al. | |
| 5,606,879 A | 3/1997 | Froelicher et al. | |
| 5,946,946 A | 9/1999 | Sharp et al. | |
| 6,009,730 A | 1/2000 | Lee | |
| 6,397,643 B1* | 6/2002 | Chang ..................... | D06F 37/24 68/23.1 |
| 2006/0231725 A1 | 10/2006 | Rebolledo | |
| 2009/0031760 A1 | 2/2009 | Kim et al. | |
| 2011/0308281 A1* | 12/2011 | Yu ........................... | D06F 37/24 68/212 |

(Continued)

FOREIGN PATENT DOCUMENTS

| | | |
|---|---|---|
| CN | 1059587 A | 3/1992 |
| CN | 1199789 A | 11/1998 |

(Continued)

OTHER PUBLICATIONS

Machine translation of KR 2020090012698, dated Dec. 2009.*

(Continued)

*Primary Examiner* — Joseph L. Perrin
*Assistant Examiner* — Kevin G Lee
(74) *Attorney, Agent, or Firm* — KED & Associates, LLP (57) ABSTRACT

A washing machine includes first and second vibration attenuators provided on a support rod and in a housing, which is supported by a spring provided at a bottom of the support rod. Both of the first and second vibration attenuators apply frictional forces during a first vibration of the tub. Only the first vibration attenuator applies a frictional force during a second vibration of the tub. The first vibration is greater than the second vibration.

6 Claims, 9 Drawing Sheets

(56) References Cited

U.S. PATENT DOCUMENTS

| | | | | |
|---|---|---|---|---|
| 2013/0248750 A1* | 9/2013 | Sauerbrey | ............... | F16K 25/00 251/318 |
| 2014/0060120 A1* | 3/2014 | Yu | ........................... | D06F 37/24 68/132 |
| 2014/0090939 A1* | 4/2014 | Kanioz | ..................... | F16F 7/09 188/271 |
| 2015/0191860 A1* | 7/2015 | Sim | ...................... | D06F 37/265 68/23.3 |

FOREIGN PATENT DOCUMENTS

| | | |
|---|---|---|
| CN | 1221050 A | 6/1999 |
| CN | 1275648 A | 12/2000 |
| CN | 101387062 A | 3/2009 |
| CN | 102660854 | 9/2012 |
| CN | 102971457 | 3/2013 |
| CN | 203049288 U | 7/2013 |
| JP | 2008-142524 | 6/2008 |
| KR | 10-1998-0086546 | 12/1998 |
| KR | 20-1999-0002471 | 1/1999 |
| KR | 20-1999-0041190 | 12/1999 |
| KR | 20-2009-0012698 | 12/2009 |
| KR | 10-2012-0072833 | 7/2012 |
| KR | 10-1398070 | 6/2014 |
| WO | WO 2014147931 A1 * | 9/2014 ............. D06F 23/04 |

OTHER PUBLICATIONS

Machine translation of WO2014147931A1, dated Sep. 2014.*
Korean Office Action dated Aug. 23, 2016, issued in Application No. 10-2014-0087719.
International Search Report and Written Opinion dated Dec. 7, 2011 issued in Application No. PCT/KR2011/004441.
U.S. Office Action dated Jul. 25, 2014 issued in U.S. Appl. No. 13/162,645.
Chinese Office Action dated Sep. 29, 2014, issued in Application No. 201180033436.5.
U.S. Final Office Action dated Dec. 9, 2014 issued in U.S. Appl. No. 13/162,645.
U.S. Office Action dated Jul. 1, 2015 issued in U.S. Appl. No. 13/162,645.
Chinese Office Action dated Jan. 4, 2017 issued in Application No. 201510404791.9 (with English translation).

* cited by examiner

WASHING MACHINE

CROSS-REFERENCE TO RELATED APPLICATION

This application claims the priority benefit of Korean Patent Application No. 10-2014-0087719, filed on Jul. 11, 2014 in the Korean Intellectual Property Office, the disclosure of which is incorporated herein by reference.

BACKGROUND

1. Field

The present disclosure relates to a washing machine which is capable of effectively attenuating vibrations generated during operation.

2. Background

Generally, a washing machine is an apparatus that washes laundry using, for example, emulsified detergent, water streams generated by the rotation of a wash tub or a pulsator, and shocks applied by the pulsator. The washing machine implements washing, rinsing, and/or dehydration to remove contaminants attached to laundry (hereinafter referred to as "clothing") using the action of detergent and water.

A washing machine generally includes a casing forming the external appearance of the washing machine, an outer tub received inside the casing in a suspended form, and an inner tub rotatably provided inside the outer tub. The washing machine further includes a suspension to attenuate vibrations of the outer tub caused by the rotation of the inner tub and/or the pulsator.

The suspension is typically configured to attenuate vibrations generated from the outer tub using, for example, the elasticity/restoration of springs or the viscosity of fluid. Although this suspension may effectively attenuate vibrations in the normal vibration state in which the outer tub vibrates within a given amplitude range, it is limited in the attenuation of vibrations in the excessive vibration state in which the outer tub vibrates at a greater amplitude than that of the normal vibration state.

In the case where the typical suspension is designed to be optimized for the excessive vibration state exhibiting a greater amplitude, the ability to attenuate normal vibrations, having a relatively small amplitude, is deteriorated. In contrast, in the case where the typical suspension is designed to be optimized for the normal vibration state, vibration attenuation sufficient to attenuate excessive vibrations cannot be expected.

Although the typical suspension includes a friction member configured to be moved along a support rod and functions to attenuate vibrations by converting vibrations into heat via friction between the friction member and the support rod, the friction member may undergo material degeneration due to frictional heat, or may stick to the support rod. Lubricant may be applied to the support rod in order to maintain a constant viscosity between the support rod and the friction member and to prevent overheating caused by friction.

Once the washing machine has been completely manufactured, it is difficult to supplement the lubricant during the process of maintenance and repair. Further, since the lubricant is gradually exhausted by continuous friction between the friction member and the support rod, it is necessary to repeatedly supplement the lubricant. When it is difficult to supplement the lubricant as in the related art, the amount of the lubricant is reduced, causing the rapid abrasion of the friction member, which results in the loss of damping force and collision between the outer tub and the casing during the generation of great vibrations such as during dehydration.

BRIEF DESCRIPTION OF THE DRAWINGS

The embodiments will be described in detail with reference to the following drawings in which like reference numerals refer to like elements wherein.

DETAILED DESCRIPTION

Figure 1:
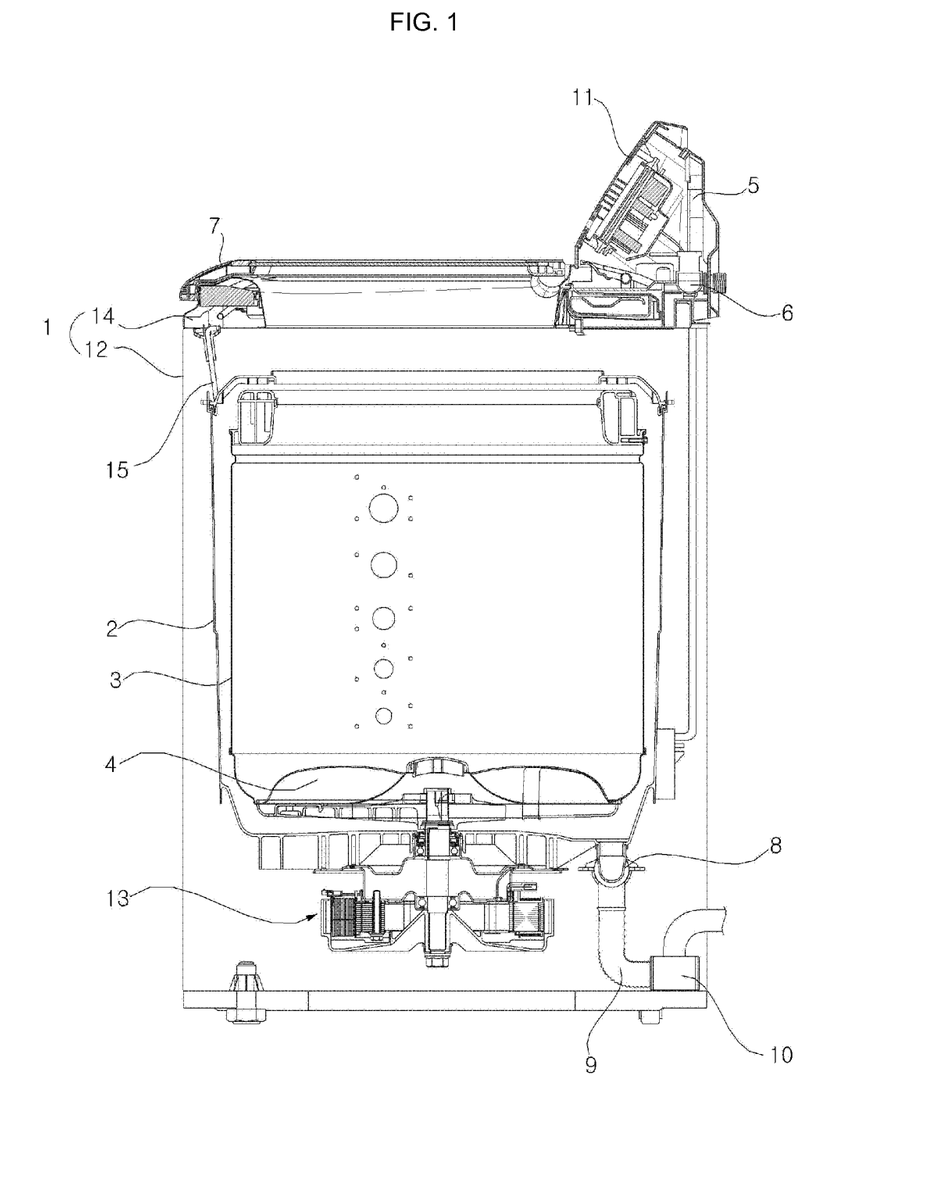
FIG. 1 is a side sectional view of a washing machine according to one embodiment of the present disclosure.
Figure 2:
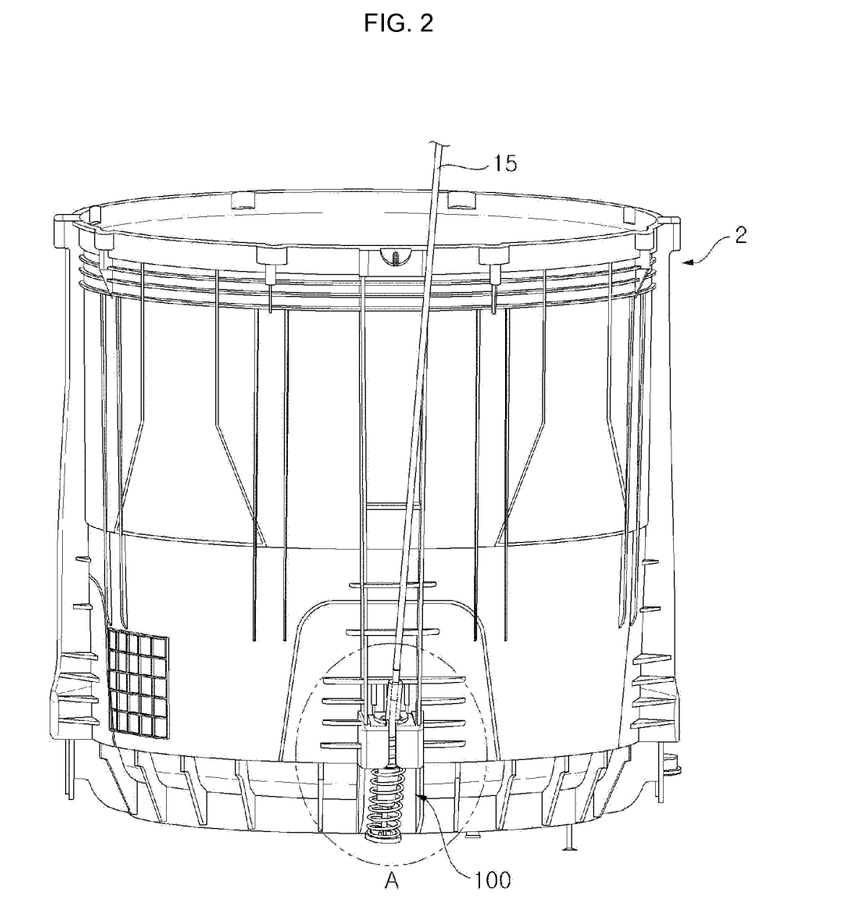
FIG. 2 is a partial perspective view illustrating a configuration in which a suspension is mounted to an outer tub illustrated in FIG. 1.
Figure 3:
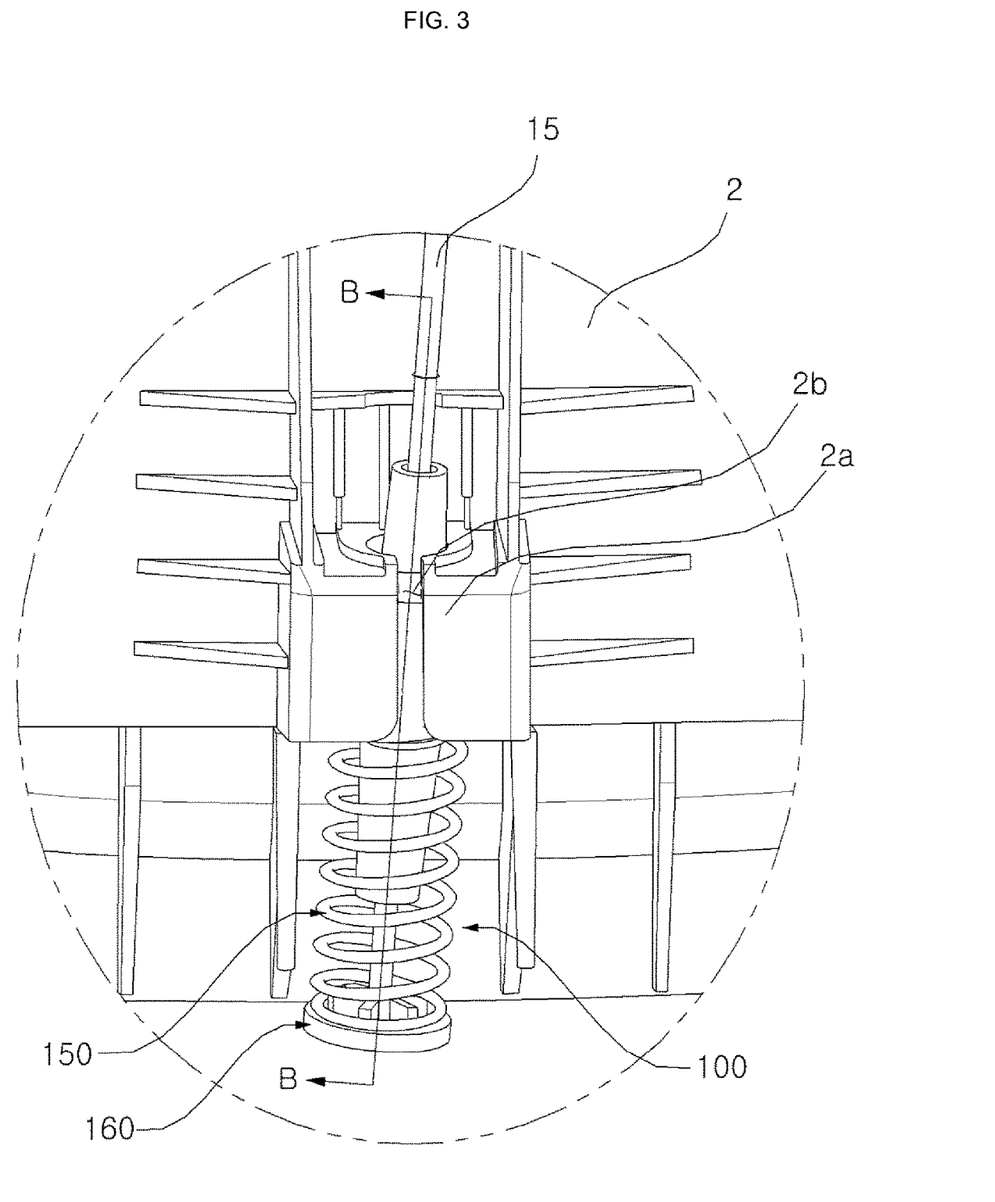
FIG. 3 is a partial enlarged view of portion A illustrated in FIG. 2.

FIG. 1 is a side sectional view of a washing machine according to one embodiment of the present disclosure. FIG. 2 is a partial perspective view illustrating a configuration in which a suspension is mounted to an outer tub illustrated in FIG. 1. FIG. 3 is a partial enlarged view of portion A illustrated in FIG. 2.

The washing machine includes a casing 1 which forms the external appearance of the washing machine, a control panel 11 which includes, for example, operating keys to receive various control instructions input by a user and a display unit to display information regarding the operating state of the washing machine, thereby constituting a user interface, and a door 7 which is rotatably coupled to the casing 1 to open or close an introduction/removal hole for the introduction and removal of laundry.

An outer tub 2, in which wash water is received, is suspended inside the casing 1 by a support rod 15. An inner tub 3, in which laundry is received, is provided inside the outer tub 2 so as to be rotatable about a vertical axis. A pulsator 4 is rotatably installed at the bottom of the inner tub 3. The inner tub 3 has a plurality of holes for the passage of wash water.

Although the casing defined in the present disclosure is sufficient so long as it forms the external appearance of the washing machine, in particular, the casing may be a stationary body which is immovable so that one end of the support rod 15, which suspends the outer tub 2 inside the casing, may be fixed by the casing. The casing 1 as described below is merely one example of a structure forming the external appearance of the washing machine and it is specified that the range of the casing described in the claims of the present application should not be limited thereto.

The casing 1 includes a cabinet 12 having an open upper side and a top cover 14 provided at the upper side of the cabinet 12. The top cover 14 is formed at an approximately central portion thereof with an introduction/removal hole for the introduction and removal of laundry.

The support rod 15 extends by a long length in the longitudinal direction thereof and has one end connected to the casing 1 and the other end connected to the outer tub 2 via a suspension 100. One end of the support rod 15 may be connected to any one of the cabinet 12 and the top cover 14. The cabinet 12 or the top cover 14 may include a connector which is pivotally connected to the support rod 15.

The support rod 15 may include a support ring or washer 160 provided at the other end thereof. The support ring 160 serves to support or to propan elastic member 150 fitted around the support rod 15 so as not to be separated from the support rod 15. The support ring 160 has a support surface to support a lower end of the elastic member 150 so as to prevent the elastic member 150 from being separated from the support rod 15. The support surface of the ring 160 may have a greater area than the cross section of the support rod 15.

Rotation of the elastic member 150 about the support rod 15 may be restricted by the support ring 160. In some embodiments, the support ring 160 may be formed with a coupling portion to be coupled to the lower end of the elastic member 150, or may be formed with a raised portion to limit the rotation of the lower end of the elastic member 150.

A water supply flow path 5 is connected to an external water source e.g., a water tap to supply water into the outer tub 2 and/or the inner tub 3. A water supply valve 6 is provided to control the water supply flow path 5. A drive unit 13, which may include a motor, a shaft and clutch, serves to drive the inner tub 3 and/or the pulsator 4. A drain flow path 9 is connected to the outer tub 2 to discharge wash water from the outer tub 2. A drain valve 8 is provided to control the drain flow path 9. A drain pump 10 is installed to the drain flow path 9 to pump the discharged wash water to the outside of the washing machine.

The suspension 100 serves to attenuate vibrations of the outer tub 2 attributable to the rotation of the inner tub 3 or the pulsator 4. The suspension 100 is coupled to a lower end of the outer tub 2. This coupling may be separable coupling to ensure easy installation and separation of the suspension 100. As illustrated in FIG. 3, a mount 2a protrudes from the outer circumferential surface of a lower portion of the outer tub 2 for the installation of the suspension 100, and the mount 2a is formed with a slit 2b which extends in the vertical direction and is open in the lateral direction.

To couple the suspension 100 and the outer tub 2 to each other, once the suspension 100 has been installed to the support rod 15, the support rod 15 is inserted into the mount 2a through a lateral opening of the slit 2b and the mount 2a is seated on the outer tub supporter 110 that will be described below in FIG. 4. Since the weight of the outer tub 2 is continuously applied to the outer tub supporter 110, the outer tub 2 and the outer tub supporter 110 are integrally moved without separation. Meanwhile, separation of the suspension 100 for maintenance and repair is easily implemented by pulling or pushing the suspension 100 slightly downward and removing the support rod 15 through the lateral opening of the slit 2b.

Figure 4:
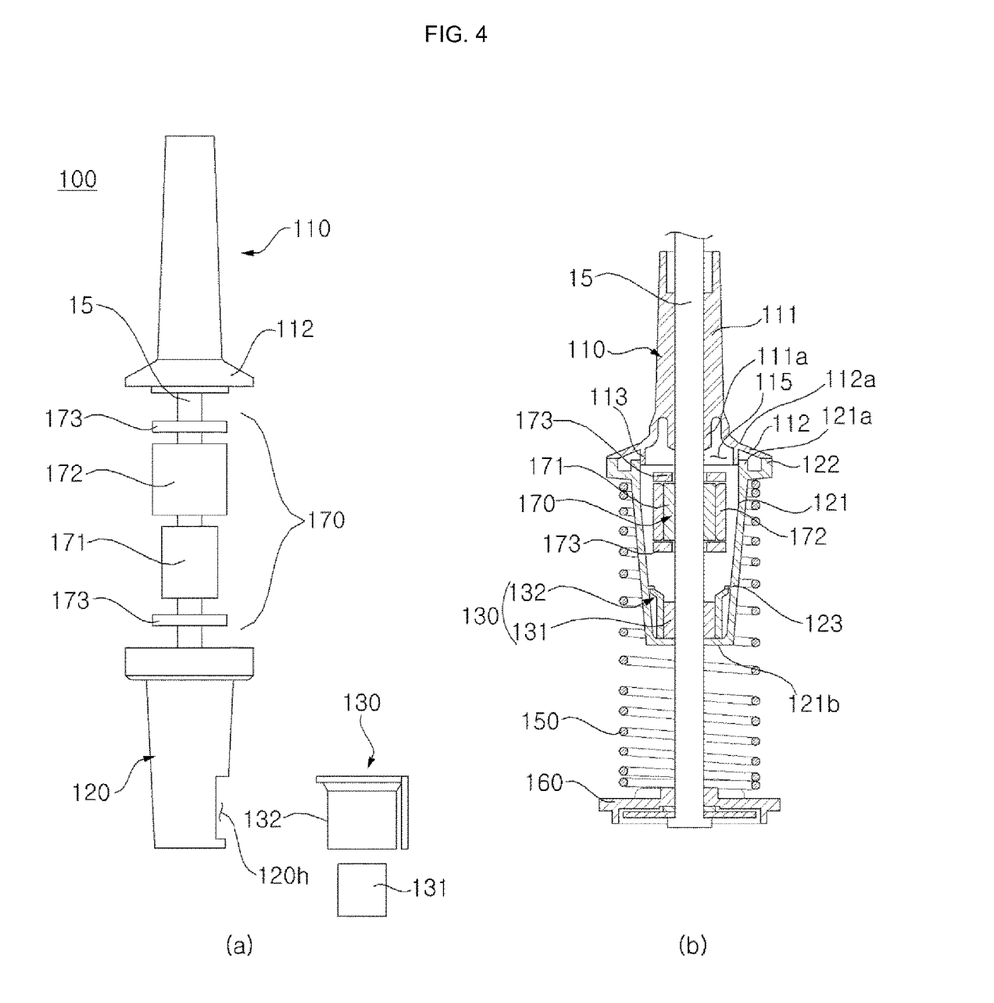
FIG. 4 shows exploded perspective views of the suspension (shown on left side with label (a)) and a longitudinal sectional view taken along line B-B of FIG. 2 (shown on right side with label (b))
Figure 5:
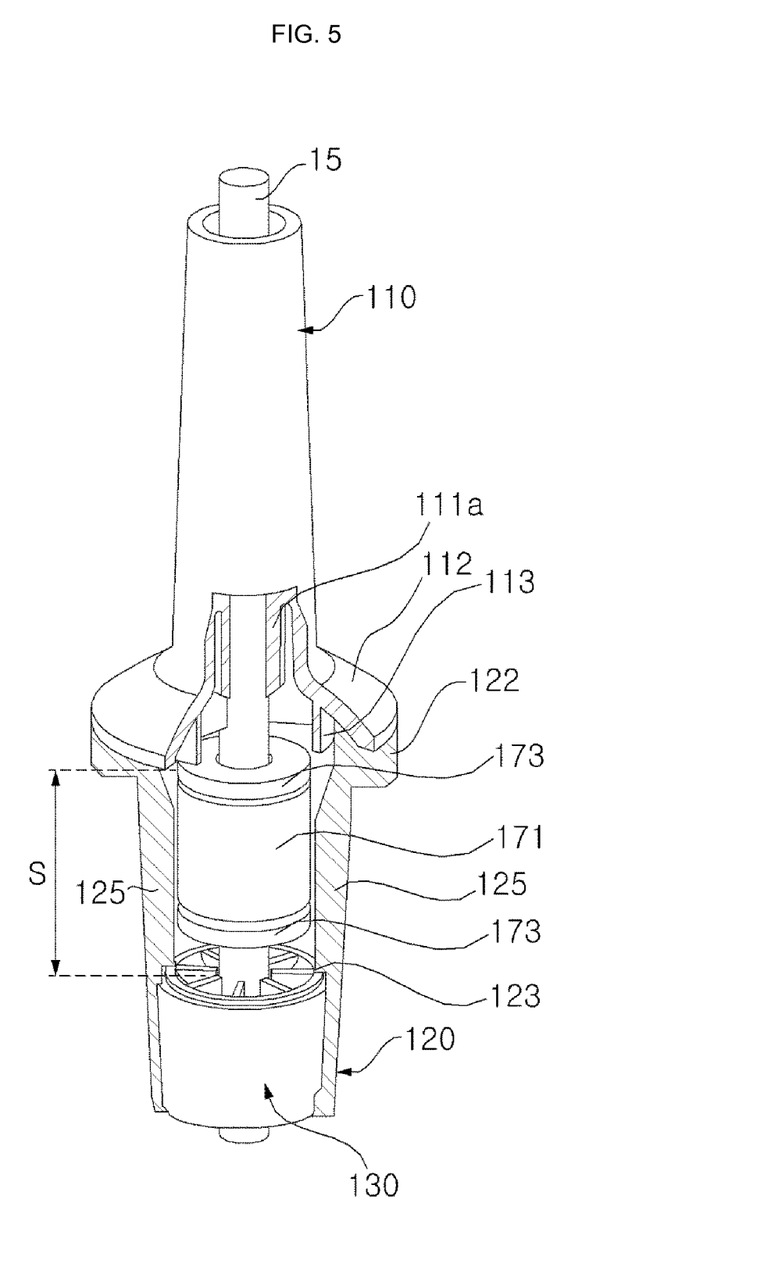
FIG. 5 is a partial cutaway view illustrating the internal configuration of the suspension.
Figure 6:
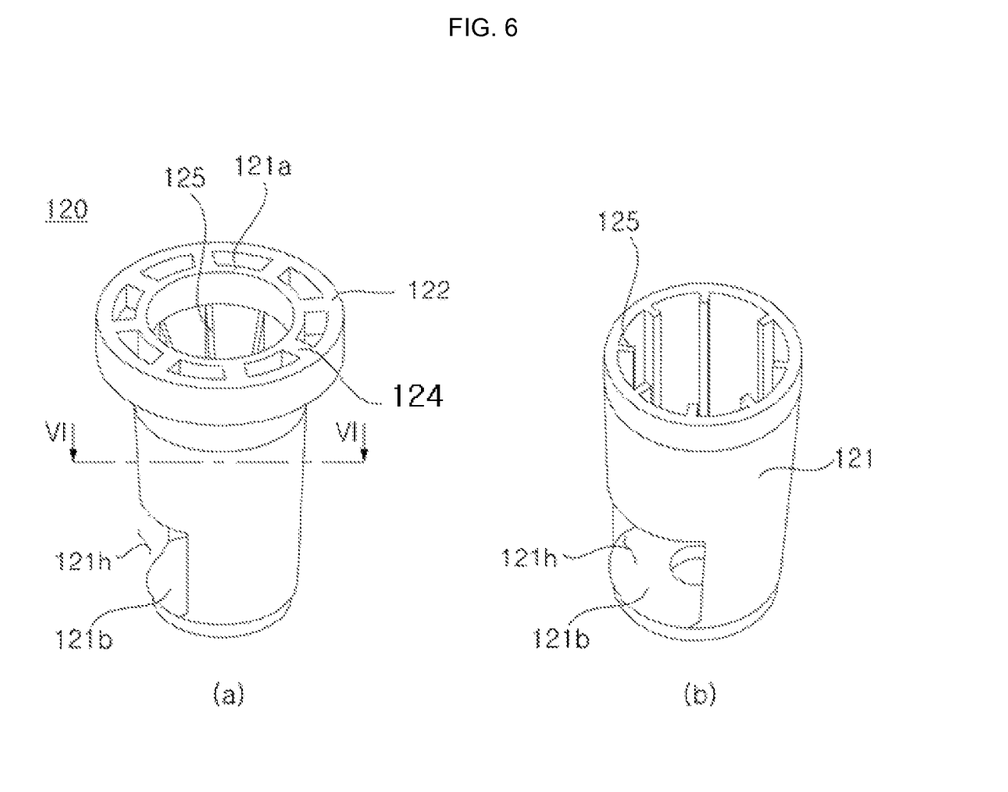
FIG. 6 shows perspective views of an outer tub supporter constituting the suspension (shown on left side with label (a)) and a cutaway perspective view of the outer tub supporter taken along line VI-VI (shown on right with label (b))
Figure 7:
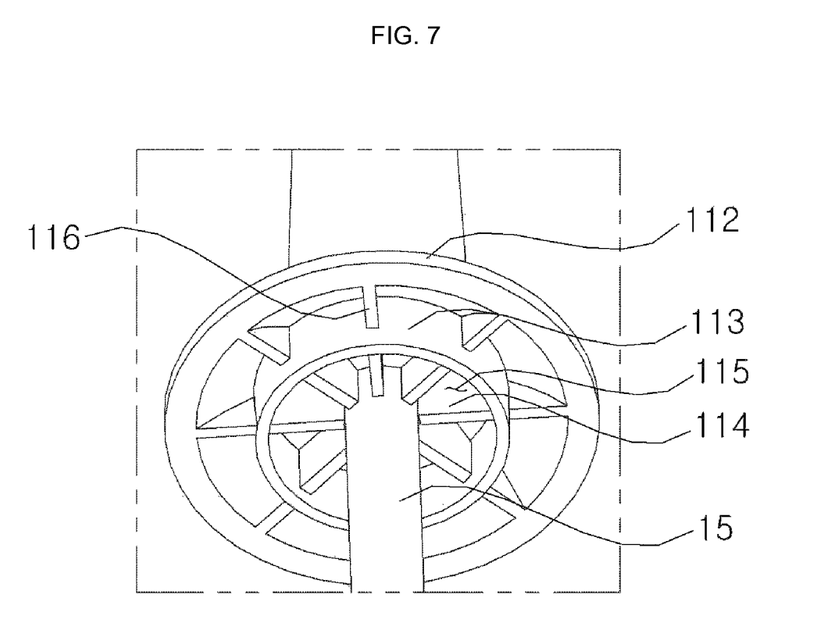
FIG. 7 is a view illustrating the interior of the outer tub supporter.
Figure 8:
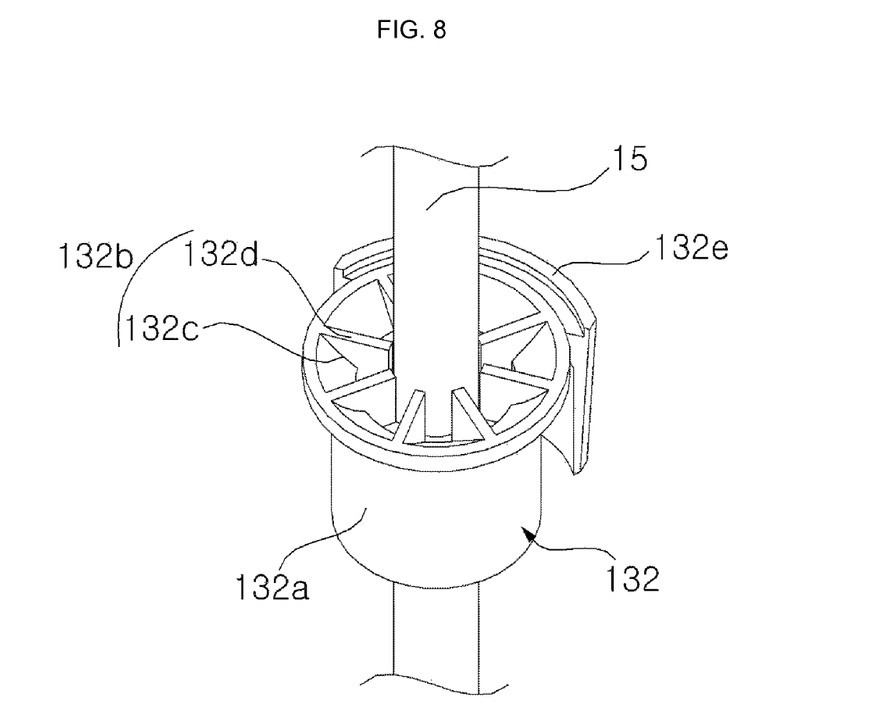
FIG. 8 is a view illustrating a first friction unit.

FIG. 4(a) is an exploded perspective view of the suspension and FIG. 4(b) is a longitudinal sectional view taken along line B-B of FIG. 2. FIG. 5 is a partial cutaway view illustrating the internal configuration of the suspension. FIG. 6(a) is a perspective view of an outer tub supporter constituting the suspension and FIG. 6(b) is a cutaway perspective view of the outer tub supporter taken along line VI-VI. FIG. 7 is a view illustrating the interior of the outer tub supporter. FIG. 8 is a view illustrating a first friction unit.

Referring to FIGS. 4 to 8, the suspension 100 includes the elastic member 150 which is supported by the support ring 160, a receiving body 120 which is movable along the support rod 15 and elastically supported by the elastic member 150. The outer tub supporter 110 is movable along the support rod 15 and configured to support the outer tub 2 while being seated on the receiving body 120. A first friction unit 130 is provided to the receiving body 120 to apply frictional force between the first friction unit 130 and the support rod 15, and a second friction unit 170 which is displaceable relative to the receiving body 120 to apply frictional force between the second friction unit 170 and the support rod 15.

The outer tub supporter 110 is configured to support the outer tub 2 and is movable along the support rod 15. The outer tub supporter 110 may include a tubular slider 111 for the penetration of the support rod 15 and a cap 112 which expands outward from the slider 111 to form a seating surface 112a on which the outer tub 2 is seated. The slider 111 may include a portion or a length 111a extending to the interior of the cap 112. The cap 112 may be held by the mount 2a of the outer tub 2 and at least a portion of the slider 111 may protrude upward from the mount 2a.

The receiving body 120 is movable along the support rod 15 and elastically supported by the elastic member 150. A lower end of the elastic member 150 is supported by the support ring 160, and an upper end of the elastic member 150 supports an outer supporting end 122 of the receiving body 120 (see FIG. 4(b)).

The outer tub supporter 110 supports the outer tub 2 at the upper side of the receiving body 120. The outer tub supporter 110 may be separably coupled to the receiving body 120. This configuration ensures easy injection of lubricant. It may be necessary to inject or supplement lubricant during the process of manufacturing the washing machine as well as when performing maintenance and repair during the useful lifetime thereof. At this time, the outer tub supporter 110, separated from the receiving body 120, is pushed upward to expose the support rod 15 covered with the outer tub supporter 110, and the lubricant may be directly applied to the exposed portion. The lubricant may also be injected to the first friction unit 130 or the second friction unit 170, which are arranged inside the receiving body 120. This lubricant injection may be convenient because it can be performed even without separating the suspension 100 from the support rod 15.

Even if the outer tub supporter 110 and the receiving body 120 are not firmly coupled to each other, the outer tub supporter 110 and the receiving body 120 may be integrated with each other, i.e. they may be moved together along the support rod 15 by the weight of the outer tub 2 because the outer tub supporter 110 supports the outer tub 2 at the upper side of the receiving body 110.

The outer tub supporter 110 internally forms a lubricant receiving space 115 in which the lubricant is received, and includes a plurality of first lubricant guiding ribs 114 (FIG. 7) which converge toward the support rod 15 within the lubricant receiving space 115. The lubricant receiving space 115 is formed inside the cap 112, and the first lubricant guiding ribs 114 protrude from the rear surface which limits the interior of the cap 112.

As shown in FIG. 7, the first lubricant guiding ribs 114 may be radially formed to converge toward the support rod 15 and may be symmetrically arranged about the support rod 15. One end of each first lubricant guiding rib 114 may be an open end facing the support rod 15 and the other end may be connected to an annular rib 113. The lubricant may be injected between the annular rib 113 and the first lubricant guiding ribs 114.

The lubricant has a prescribed viscosity and may be directly injected even if the bottom of the lubricant receiving space 115 is open. Alternatively, the outer tub supporter 110 may be pushed upward along the support rod 15 to expose a portion of the support rod 15 that is covered with the outer tub supporter 110 and, after the lubricant is applied to the exposed portion, the lubricant applied to the support rod 15 may naturally gather in the lubricant receiving space 115 as the outer tub supporter 110 is pulled downward to the original position thereof.

The outer tub supporter 110 may further include outer ribs 116 which extend from the annular rib 113 in the opposite direction of the first lubricant guiding ribs 114. The outer ribs 116 and the first lubricant guiding ribs 114 may extend along the same line. The lubricant may also be received between the respective outer ribs 116.

The first friction unit 130 and the second friction unit 170 are movable along the support rod 15 respectively such that frictional force (more particularly, kinetic friction during the vibration of the outer tub 2) is generated between the respective friction units 130 and 170 and the support rod 15. The first friction unit 130 and the second friction unit 170 are received inside the receiving body 120. The first friction unit 130 and the second friction unit 170 may respectively include friction members 131 and 171 to apply frictional force between the friction units 130 and 170 and the outer circumferential surface of the support rod 15.

As illustrated in FIG. 4, the first friction unit 130 may include a first friction member 131 to generate friction along with the outer circumferential surface of the support rod 15 and a first friction member housing 132. As illustrated in FIG. 8, the first friction member housing 132 includes a tubular sidewall portion 132a, through which the support rod 15 passes, the first friction member 131 being interposed between the tubular sidewall portion 132a and the support rod 15, and a lubricant receiving portion or space 132b provided above the sidewall portion 132a to receive the lubricant therein.

The lubricant receiving portion 132b may include a bottom surface 132c which expands from the inner circumferential surface of the sidewall portion 132a and second lubricant guiding ribs 132d which protrude from the bottom surface 132c to extend toward the support rod 15. The second lubricant guiding ribs 132d may be radially arranged to converge toward the support rod 15. The second lubricant guiding ribs 132d may be symmetrically arranged about the support rod 15.

To allow the lubricant to be directly guided to the support rod 15 along the second lubricant guiding ribs 132d, ends of the second lubricant guiding ribs 132d may come into contact with the support rod 15. While the first friction unit 130 is moved along the support rod 15, the lubricant in the lubricant receiving portion 132b is injected to the support rod 15 along the second lubricant guiding ribs 132d. In this process, some of the lubricant may reach the first friction member 131 located inside the sidewall portion 132a. For the smooth flow of the lubricant, the bottom surface 132c may be inclined downward to the support rod 15.

The second friction unit 170 may include a tubular second friction member housing 172 in which the second friction member 171 is received and a shock absorbing member 173 provided above and/or below the second friction member housing 172. The shock absorbing member 173 may be formed of a porous fiber material such as, for example, felt or an elastic material such as, for example, rubber. The shock absorbing member 173 serves to attenuate shocks between the second friction unit 170 and the receiving body 120 and to reduce collision noise therebetween.

Friction between the two friction units 130 and 170 and the support rod 15 exhibits different aspects based on the amplitude of vibration of the outer tub 2. For example, when operating the washing machine, in the case where the outer tub 2 resonates based on the physical ringeries of the entire vibration system, or for an excessive vibration period, during which excessive vibrations are generated due to the unbalanced arrangement of clothing inside the inner tub 3, the first friction unit 130 and the second friction unit 170 are moved integrally with the outer tub supporter 110, causing kinetic friction between the friction units 130 and 170 and the support rod 15. Accordingly, for the excessive vibration period, vibration energy is positively dissipated by friction of both the first and second friction units 130 and 170.

During which the amplitude of vibration of the outer tub 2 is sufficiently lower than that of the excessive vibration period (e.g., a normal vibration period), only the first friction unit 130 performs vibration attenuation by friction. The second friction unit 170 may remain stationary at a prescribed position on the support rod 15 while being separated from the receiving body 120 when the first friction unit 130 is moved along the support rod 15. The outer tub 2 can vibrate relatively freely while vibration attenuation is implemented by friction of only the first friction unit 130.

The suspension 100 implements vibration attenuation using one friction unit 130 during the relatively stable period, but implements positive attenuation by friction using the two friction units 130 and 170 during the excessive vibration period while the washing machine is operating. The washing machine according to the present embodiment allows the outer tub 2 to be moved relatively freely within a predetermined allowable amplitude range in consideration of, for example, the durability of the appliance and an allowable vibration displacement, but more positively attenuates vibrations to limit the amplitude of vibration when vibrations are generated beyond a given level. As such, the washing machine shows different aspects of vibration attenuation based on the amplitude of vibration.

In some embodiments, the first friction unit 130 may also be permitted to be slightly displaced within the receiving body 120. However, even in this case, to allow vibration attenuation by the first friction unit 130 and the second friction unit 170 to be implemented in different aspects depending on the amplitude of vibration of the outer tub 2, the maximum displacement of the second friction unit 170 must be greater than the maximum displacement of the first friction unit 130 which is permitted due to their relationships with respect to the receiving body 120. The first friction unit 130 may be fixed to the receiving body 120 and the second friction unit 170 may be permitted to be displaced relative to the receiving body 120 within the space delimited by the receiving body 120. In FIG. 5, "S" designates a section in which displacement of the second friction unit 170 is permitted relative to the receiving body 120.

As illustrated in FIG. 6, the receiving body 120 may include a main body housing 121 which forms a friction unit receiving space in which the first friction unit 130 and the second friction unit 170 are received. The main body housing 121 may have a top opening for insertion of the second friction unit 170. In addition, the receiving body 120 may include an outer supporting end 122 which expands outward from the top of the main body housing 121 to support a lower end of the cap 112 of the outer tub supporter 110. The top opening is defined as the interior surrounded by an upper end 121a of the main body housing 121. The outer tub supporter 110 may include the annular rib 113 protruding downward from the inner surface of the cap 112. The annular rib 113 is inserted into the top opening of the main body housing 121 and, at this time, the rib 113 is interference-fitted to come into close contact at the outer circumferential surface thereof with the upper end 121a of the main body housing 121.

A plurality of connection ribs 124 may be formed to connect the upper end 121a of the main body housing 121 and the outer supporting end 122 to each other and may be spaced apart from one another. The connection ribs 124 serve to increase the strength of the main body housing 121.

The main body housing 121 has a bottom portion 121b having a hole for the passage of the support rod 15. The first friction unit 130 is disposed inside the main body housing 121 so as to be supported by the bottom portion 121b. A limiting protrusion 123 may protrude from the inner circumferential surface of the main body housing 121 to limit the upward movement of the first friction unit 130. The limiting protrusion 123 may have an annular shape.

The main body housing 121 may further include a plurality of guiding ribs 125 which protrudes from the inner circumferential surface delimiting the friction unit receiving space toward the outer circumferential surface of the second friction unit 170 so as to extend in the longitudinal direction and which is symmetrically arranged about the support rod 15. Lower ends of the guiding ribs 125 may be connected to the limiting protrusion 123. The second friction unit 170 comes into contact with and is supported by the guiding ribs 125 when being displaced relative to the receiving body 120, which may prevent the shaking of the second friction unit 170 during movement.

The main body housing 121 may have a transverse opening 121h and the first friction unit 130 may be inserted into the main body housing 121 through the opening 121h. The first friction member housing 132 may include an opening cover 132e to close the opening 121h formed in the main body housing 121 in the transverse direction when received in the receiving body 120. The opening cover 132e is shaped to substantially correspond to the opening 121h. The first friction member housing 132 may be configured such that the sidewall portion 132a, the lubricant receiving portion 132b, and the opening cover 132e constitute a single component.

Figure 9:
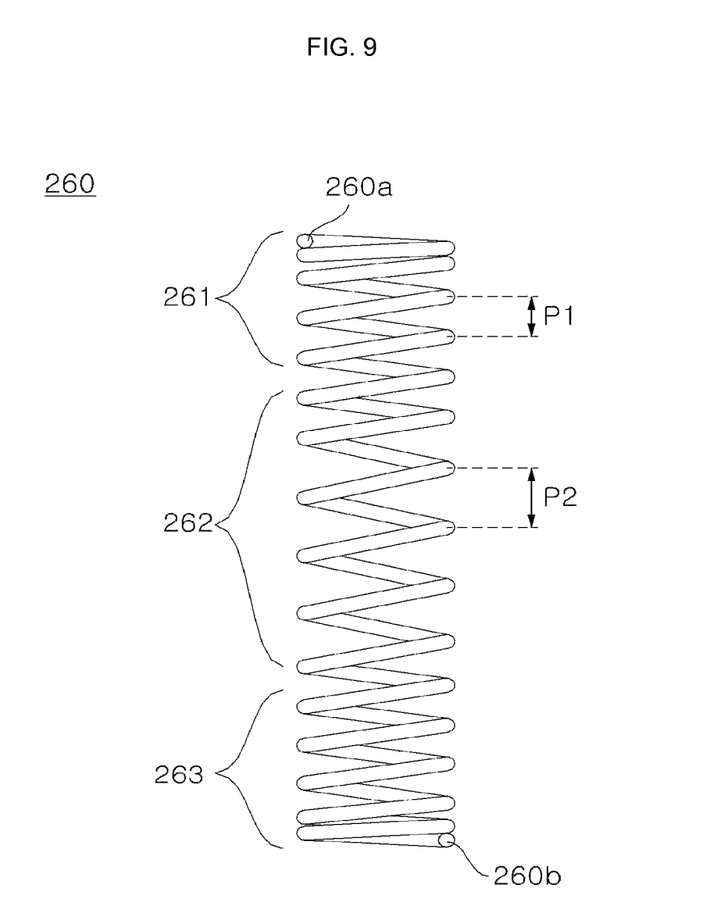
FIG. 9 is a view illustrating an elastic member according to another embodiment of the present disclosure.

FIG. 9 is a view illustrating an elastic member according to another embodiment of the present disclosure. The elastic coefficient of the elastic member may vary nonlinearly according to the load. One example of the elastic member may be an unequal pitch spring 260 in which a prescribed section has a different pitch from another section. The unequal pitch spring 260 may include a first section 261 having a given pitch P1 and a second section 262 having a second pitch P2 different from that of the first section 261. In some embodiments, the unequal pitch spring 260 may have a greater number of sections having different pitches from one another. In the present embodiment, a third section 263 is further formed below the second section 262 and the third section 263 may have the same pitch as the first section 261, without being limited thereto. Among the first section 261, the second section 262, and the third section 263, the second section 262 may have the greatest pitch P2. The unequal pitch spring 260 shows nonlinear characteristics in that elasticity successively varies and, thus, may exert the smoother damping of vibration of the outer tub 2.

An upper end 260a and a lower end 260b of the unequal pitch spring 260 are symmetrical to each other about the center axis along which the support rod 15 passes. With this structure, the unequal pitch spring 260 has a relatively constant height at any position of the upper end when compressed. Thus, the elastic/restoration force of the spring may be accurately transmitted in the longitudinal direction and distortion of the spring attributable to pressure applied to the upper end 260a or the lower end 260b may be prevented.

Meanwhile, the symmetrical structure between the upper end and the lower end of the spring is not limited to the unequal pitch spring 260 and, of course, the elastic member 150 in the form of a spring according to the above-described embodiment may also have upper and lower ends which are symmetrical to each other about the center along which the support rod 15 passes.

A washing machine prevents deterioration in vibration attenuation by a suspension due to the shortage of lubricant.

A washing machine may include a suspension, where supplemental or additional lubricant may be readily applied.

A washing machine has a receiving body, which configured to receive a friction unit for generating frictional force along with a support rod, is separable from an outer tub supporter configured to support an outer tub at the upper side of the receiving body.

A washing machine may be configured to automatically supplement lubricant in the suspension during the vibration of an outer tub.

A washing machine may be capable of effectively attenuating vibrations even if the amplitude of vibration of an outer tub varies.

A washing machine may be is capable of effectively attenuating the vibration of an outer tub not only in the normal vibration state, in which the amplitude of vibration of the outer tub is within a prescribed range, but also in the excessive vibration state, in which the amplitude of vibration of the outer tub is relatively great.

A washing machine may increase the capacity of an outer tub.

A washing machine may achieve improved durability and stability and reduce generation of noise.

A washing machine may include a casing, an outer tub configured to receive wash water therein, a support rod configured to extend in a longitudinal direction, the support rod having one end connected to the casing and the other end provided with a support ring, an elastic member configured to be supported by the support ring, a receiving body configured to be movable along the support rod, the receiving body being elastically supported by the elastic member, an outer tub supporter configured to be movable along the support rod, the outer tub supporter supporting the outer tub while being seated on the receiving body, a first friction unit fixed to the receiving body to apply frictional force between the first friction unit and the support rod, and a second friction unit configured to apply frictional force between the second friction unit and the support rod, the second friction unit being permitted to be displaced relative to the receiving body, wherein the outer tub supporter internally forms a lubricant receiving space for reception of lubricant and includes a plurality of first lubricant guiding ribs configured to converge toward the support rod within the lubricant receiving space.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A washing machine comprising:
    a casing;
    an outer tub configured to receive wash water therein;
    a support rod configured to extend in a longitudinal direction, the support rod having a first end connected to the casing and a second end provided with a support ring;
    an elastic member coupled to the support rod;
    a receiving body configured to be movable along the support rod, the receiving body being elastically supported by the elastic member;
    an outer tub supporter configured to be movable along the support rod, the outer tub supporter supporting the outer tub while being seated on the receiving body;
    a first friction module provided in the receiving body to apply a first frictional force to the support rod; and
    a second friction module configured to apply a second frictional force to the support rod, the second friction module being movable relative to the receiving body,
    wherein the outer tub supporter provides a lubricant receiving space inside the outer tub supporter that receives lubricant and includes a plurality of first lubricant guiding ribs configured to converge toward the support rod within the lubricant receiving space,
    wherein the receiving body has a transverse opening,
    wherein the first friction module is inserted into the receiving body through the opening,
    wherein the first friction module includes:
        a friction member configured to apply frictional force between the friction member and an outer circumferential surface of the support rod; and
        a friction member housing having a tubular sidewall portion through which the support rod passes, the friction member being interposed between the support rod and the sidewall portion, and a lubricant receiving portion provided above the sidewall portion to receive the lubricant therein, wherein the lubricant receiving portion includes:
            a bottom surface configured to expand outward from an inner circumferential surface of the sidewall portion; and
            a second lubricant guiding rib configured to protrude from the bottom surface so as to extend toward the support rod.

2. The washing machine according to claim 1, wherein the second lubricant guiding rib includes a plurality of second lubricant guiding ribs radially arranged to converge toward the support rod.

3. The washing machine according to claim 2, wherein the plurality of second lubricant guiding ribs are symmetrically arranged.

4. The washing machine according to claim 1, wherein the bottom surface is inclined downward toward the support rod.

5. The washing machine according to claim 1, wherein the elastic member is a spring configured to allow the support rod to pass therethrough, and wherein the spring has upper and lower ends symmetrically arranged about a center for passage of the support rod.

6. The washing machine according to claim 1, wherein the elastic member is an unequal pitch spring.

* * * * *